US006430592B1

(12) United States Patent
Davison

(10) Patent No.: US 6,430,592 B1
(45) Date of Patent: Aug. 6, 2002

(54) SYSTEM FOR SHARING CPU TIME AMONGST MULTIPLE USERS

(75) Inventor: Gerald Allen Davison, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/252,864

(22) Filed: Jun. 2, 1994

(51) Int. Cl.[7] .............................................. G06F 9/00
(52) U.S. Cl. ...................................... 709/103; 709/107
(58) Field of Search ................................ 395/650, 670; 364/281.3; 709/100, 310, 103, 107

(56) References Cited

U.S. PATENT DOCUMENTS

| 4,388,688 A | | 6/1983 | Curlee, III et al. |
| 4,481,583 A | * | 11/1984 | Mueller ...................... 364/300 |
| 4,631,674 A | | 12/1986 | Blandy |
| 4,736,318 A | * | 4/1988 | Delyani et al. ............. 364/200 |
| 4,989,133 A | | 1/1991 | May et al. |
| 5,193,187 A | | 3/1993 | Strout, II et al. |
| 5,291,599 A | | 3/1994 | Cohen et al. |
| 5,325,525 A | * | 6/1994 | Shan et al. .................. 395/650 |
| 5,339,425 A | * | 8/1994 | Vanderah et al. ........... 395/700 |
| 5,448,735 A | * | 9/1995 | Anderson et al. ........... 395/650 |

FOREIGN PATENT DOCUMENTS

GB 2236880 4/1991

OTHER PUBLICATIONS

Lehoceky et al, An Optimal Algorithm for Scheduling Soft–Aperiodic Tasks in Fixed–Priority Preemptive Systems, Real Time Systems, 1995 Symp. pp 110–123.*

Sprunt et al., Exploiting Unused Periodic Time for Aperiodic Sevice Using the Extended Priority Exchange Algorithm, Real Time Systems, 1998 Symp. pp 251–258.*

Ku et al, Relative scheduling Under Timing Constraints, Design Automation conf., 1990 ACM/IEEE Conf. pp. 59–64.*

Shen et al, Resource Reclaiming in Multiprocessor Real–Time Systems, IEEE Trans. on Parallel & Distributed Syst. Apr. 1993 V:4 Issue 4 pp. 382–397.*

Tokuda et al, An Integrated Time–Driven Scheduler for the Arts Kernel, Comps. & Comm., 1989 Int'l Phoenix Conf., 1989, pp. 486–496.*

* cited by examiner

Primary Examiner—Alvin Oberley
Assistant Examiner—Sue Lao
(74) Attorney, Agent, or Firm—Arthur J. Samodovitz

(57) ABSTRACT

A computer system allocates processor time to multiple users. A systems operator or other administrator specifies to the computer a share of processor time for each user. The share can be absolute or relative. The system executes users which are I/O bound with processor time less than their respective, specified share(s) by not using significant processor time on users which are waiting for an I/O operation to complete but expediting allocation of a processor to users after their respective I/O operations complete. The system executes users which are CPU bound with processor time greater than their respective, specified share(s) based on their respective shares in relation to a sum of shares of other CPU bound users but excluding shares of I/O bound users. For each user there is also a specified "soft limit", "hard limit" or "no limit". When any hard limit user reaches its hard limit, no further allocation is made. When any soft limit user reaches its soft limit, no further allocation is made to this soft limit user if any other soft limit user has yet to reach its soft limit or any other hard limit user has yet to reach its hard limit or if there are any unlimited users which can use more processor time.

27 Claims, 8 Drawing Sheets

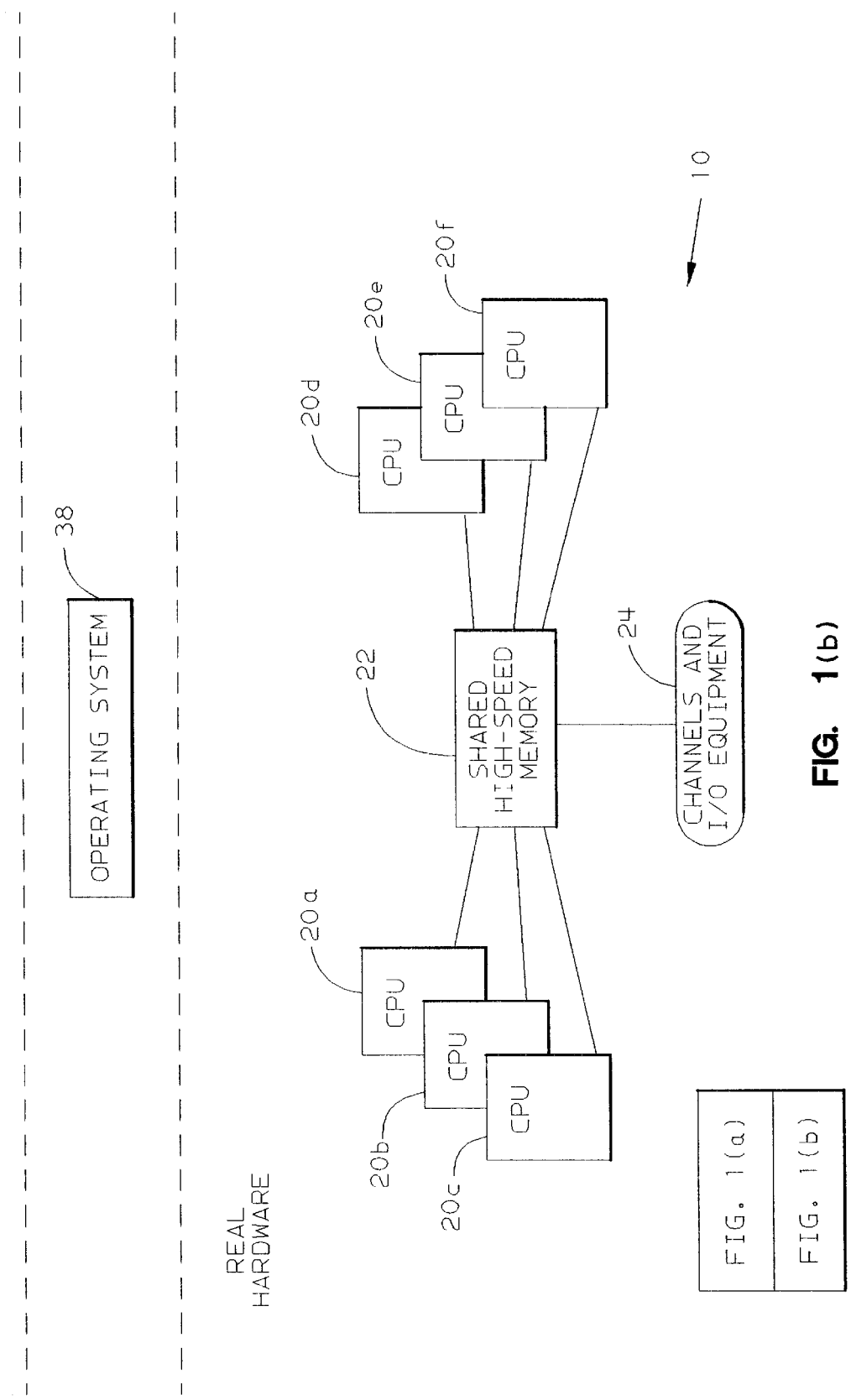

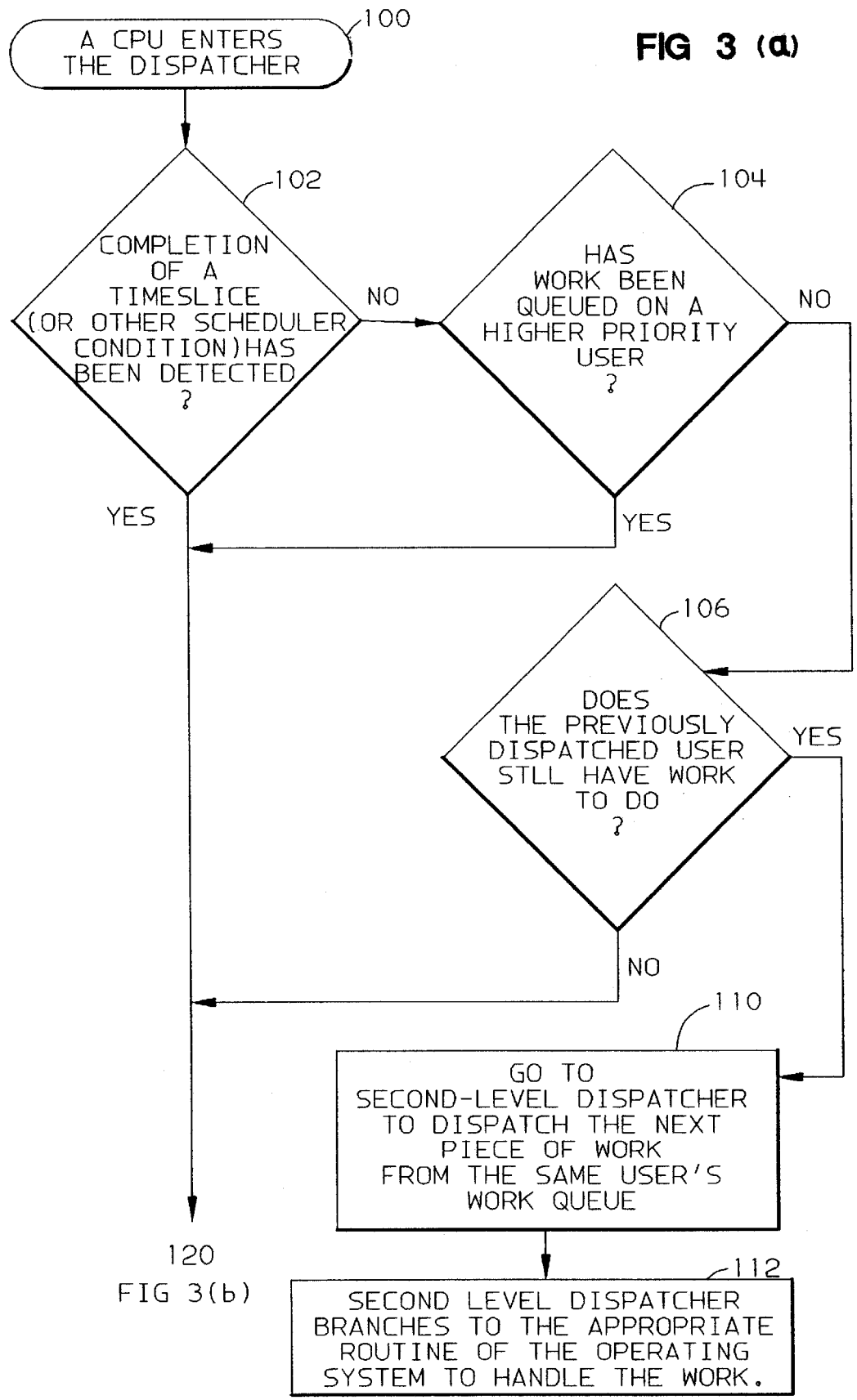

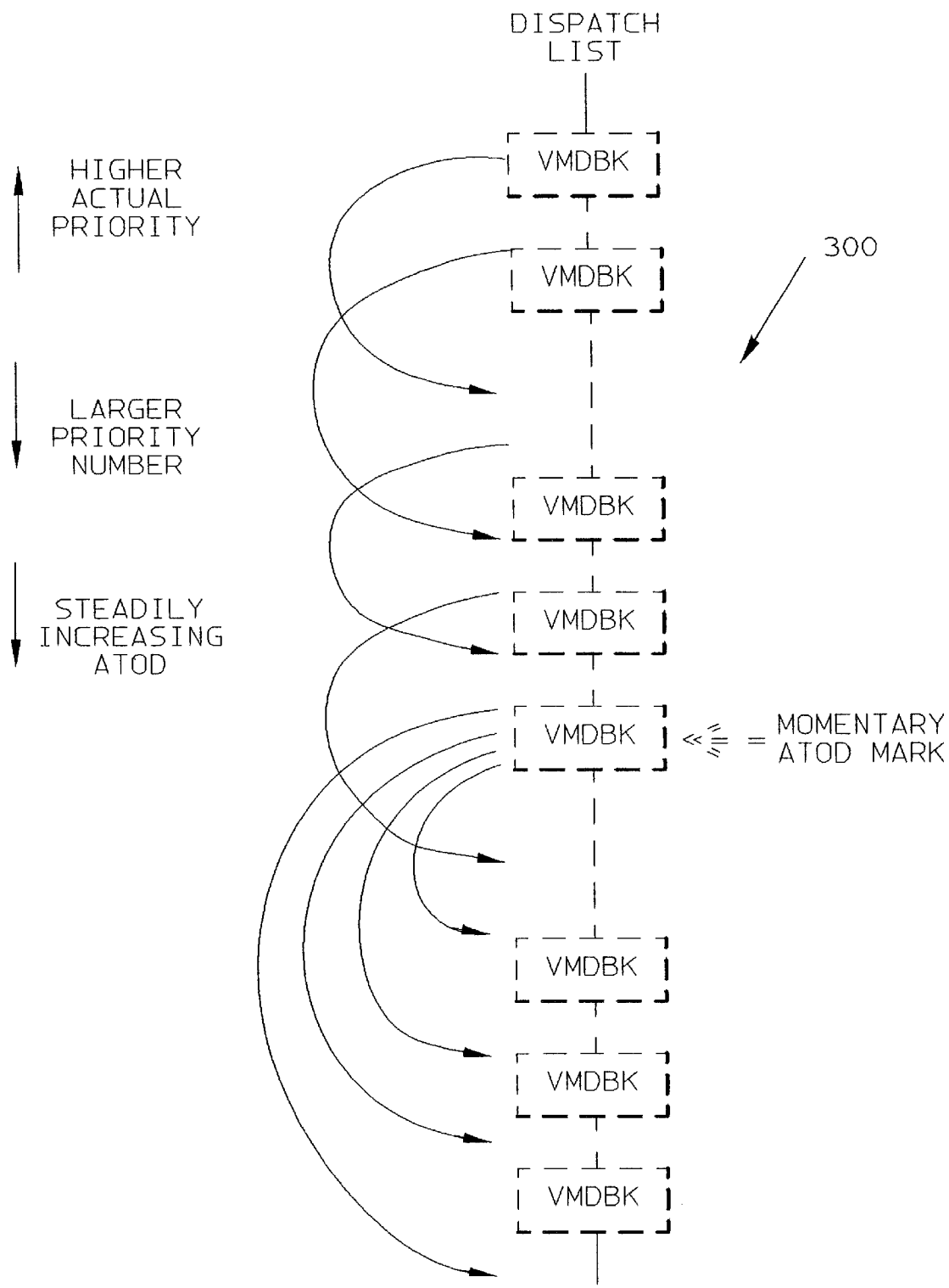

SYSTEM FOR SHARING CPU TIME AMONGST MULTIPLE USERS

BACKGROUND OF THE INVENTION

The invention relates generally to computer systems, and deals more particularly with sharing of processing time of one or more processors by multiple users.

Often in a computer system, many programs or users require execution concurrently. There may be one or more processors available to execute the multiple programs. Any one processor can only execute one program or transaction at any one time. If two or more programs request execution at the same time, and there is only one processor or fewer processors than the number of programs requiring execution, the operating system must determine which program can use the one or each processor at any one time. Typically this decision is based on a relative priority of each of the programs. Typically also, programs which are in a wait state, such as those waiting for a slow I/O operation to complete, are "suspended" and therefore not eligible to compete for the processor regardless of their priority.

In addition to deciding which program can utilize the one or each processor at a particular time, the operating system must also determine how long the selected program can utilize the respective processor after it begins to execute so that other programs of equal (or perhaps lower) priority can get their turn. There are several known techniques for determining how long each program should be permitted to utilize a processor after it begins to execute. In the simplest technique, the highest priority program maintains its use of the processor until completion (or suspension). However, this may permit this program to "hog" the processor, and "starve" the other programs. In another known technique, each program which is selected for execution is given a share or "slice" of the total processor time. The shares of the programs can be equal or preferably weighted based on various factors. One known technique to weight the shares is as follows. Some of programs are defined to command an "absolute" or definite share of the total processor time, and others are defined to command a "relative" share of the remaining processor time. The absolute shares are "taken off the top" and the relative shares divide the remainder in proportion to their relative shares. For example, a first program is defined with a forty percent absolute share, a second program is defined with a one hundred relative share and a third program is defined with a three hundred relative share. In this scenario, the first program will command forty percent of the total processor time, the second program will command fifteen percent of the total processor time and the third program will command forty five percent of the total processor time.

A program may not need its entire absolute or relative share. A known technique to allocate the excess in this absolute/relative share environment is to give all the excess to the program with the highest absolute or relative share. If the excess were a small percentage of the total processor time, this known technique would suffice. However, in many cases, the excess is substantial, such as one half of the total processor time, and it may not be optimum to allocate all the excess to one program.

Accordingly, a general object of the present invention is to provide an improved system for allocating excess processor time to multiple programs or users.

SUMMARY OF THE INVENTION

The present invention resides in a computer system for allocating processor time to multiple users. A systems operator or a user specifies to the computer a share of processor time for each user. The share can be absolute or relative. The system executes users which are I/O bound with processor time less than their respective, specified share(s) by not using significant processor time on users which are waiting for an I/O operation to complete but expediting allocation of a processor to users after their respective I/O operations complete. The system executes users which are CPU bound with processor time greater than their respective, specified share(s) based on their respective shares in relation to a sum of shares of other CPU bound users but excluding shares of I/O bound users.

In accordance with another feature of the present invention, for each user there is also a specified "soft limit", "hard limit" or "no limit". When any hard limit user reaches its hard limit, no further allocation is made. When any soft limit user reaches its soft limit, no further allocation is made to this soft limit user if any other soft limit user has yet to reach its soft limit or any other hard limit user has yet to reach its hard limit or if there are any unlimited users. The other soft limit and hard limit users who have not yet reached their limits continue to receive extra shares until they also reach their respective limits. When all other soft limit users have reached their soft limits and all hard limit users have reached their hard limits and if there are no unlimited users, then the soft limit user with the greatest absolute share or relative share (computed as if there was no unused processing time) receives all the remaining unused processing time.

The share allocation technique of the present invention is implemented by re-positioning or offsetting each user downward in the dispatch list after the user completes each time slice. The amount of offset for a user is based on the magnitude of the absolute or relative share of the user and the current position of the user. After completing each time slice for a user located in a bottom part of the dispatch list, the user is repositioned later in the dispatch list by an offset based on a magnitude of the user's share in relation to the shares of other users located in the bottom part of the dispatch list. However, after completing each time slice for a user located in a top part of the dispatch list, the user is repositioned later in the dispatch list by an offset based on the magnitude of the user's share in relation to other users throughout the dispatch list.

The soft and hard users are limited in accordance with their specified limits by establishing a significant, minimum offset when they reach their limits. Moreover, the hard limited users are taken off a run list when they exceed their limits.

BRIEF DESCRIPTION OF THE FIGURES

FIG. 5 illustrates a dispatch list within the computer system of FIG. 1.

DETAILED DESCRIPTION OF THE PREFERRED EMBODIMENT

Figure 1A:
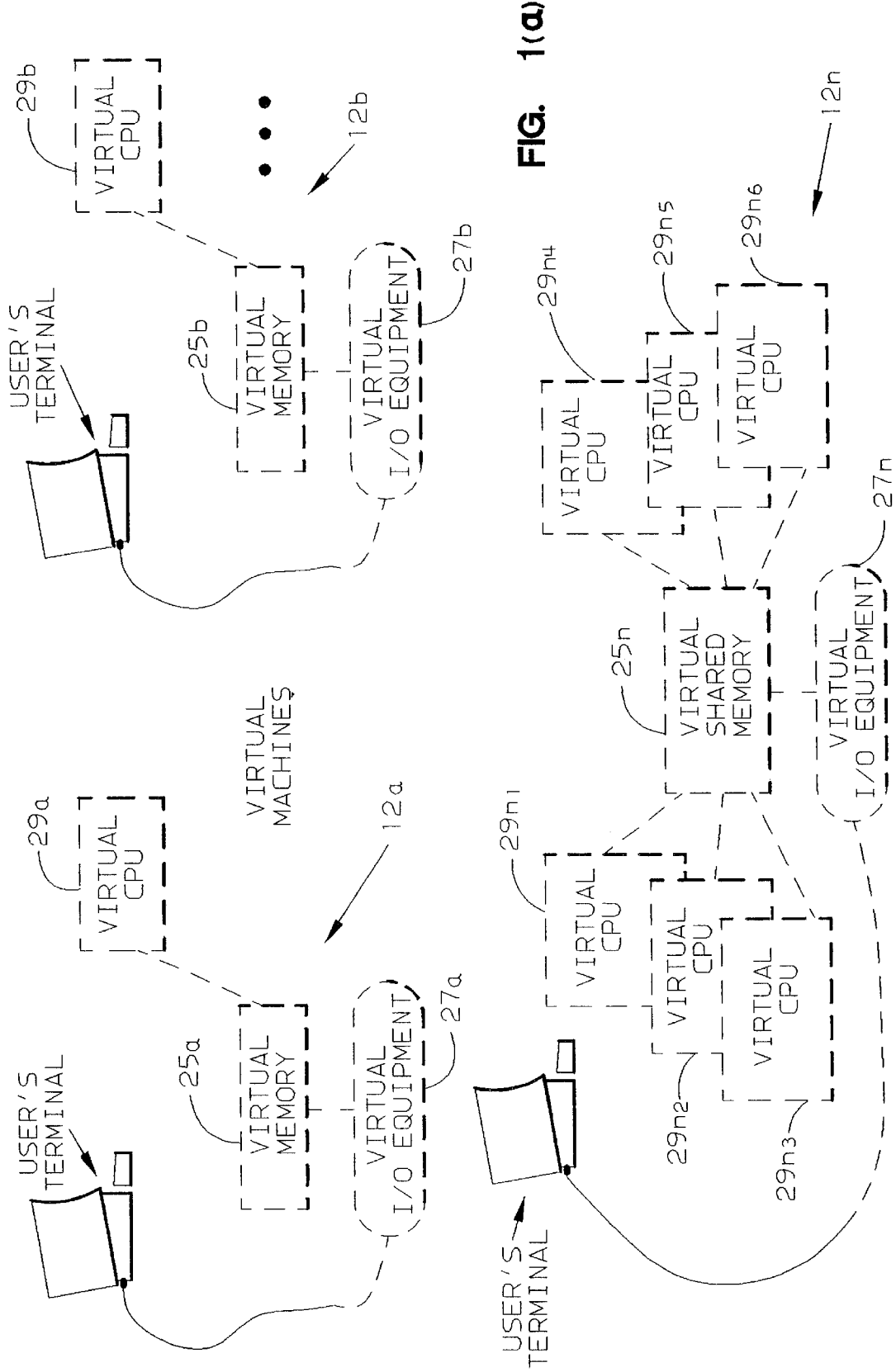
FIGS. 1(a–b) form a block diagram of a computer system according to the present invention.

Referring now to the drawings in detail wherein like reference numerals indicate like elements throughout the several views, FIG. 1(a–b) illustrate a virtual machine computer system generally designated 10 embodying the present invention. However, it should be noted that even though computer system 10 is a virtual machine type, the present invention is highly useful in nonvirtual machine types of computer systems as well.

Each virtual machine or user 12a–n serves a human operator or an automatically operated application, and one or more processors 20a–f may support several thousand such users. By way of example, an IBM System/390 computer provides the processors 20a–f, real memory 22, and channel and I/O devices 24. While FIG. 1(a–b) illustrate that computer system 10 comprises six processors 20a–f, the present invention is equally applicable with a single processor for all users. To an operator, the virtual machine appears to be a real machine except that the operator's access is not always immediate.

Each user is given virtual storage or virtual memory 25a,b,n, virtual I/O devices 27a,b,n (such as virtual disks or "minidisks"), and one or more virtual CPUs 29a,b,n (Central Processing Units) as illustrated in FIG. 1(a–b). The user's virtual machine is initially empty, requiring that it be "booted" with an operating system before any application can be executed. Characteristics for each user such as size of memory, virtual disks, etc. are defined in a system directory. The user's virtual system is created, i.e. memory allocated, etc. when the user "logs on" with a valid password. After the virtual system is created, the virtual system is represented by a control block called "VMDBK" (Virtual Machine Description Block) and an absolute or relative share is assigned to the user, as specified in the directory. The system operator may later alter the virtual system's share if desired.

Operating system 38 comprises a separate Conversational Monitoring System (CMS) component for each user and a common, Control Program (CP) component for all users. The CMS component provides the user interface (for a human operator or automatic application). The CP component controls the hardware including the processor(s) and provides most of the operating system function, and is responsible for allocating processor time to the various users. Thus, each virtual machine and the respective application, human operator if any, and CMS component can be viewed as the "user" which requires processor time, and the CP component can be viewed as the heart of the operating system which performs the allocation, dispatching, scheduling and other functions.

DISPATCHER, SCHEDULER AND STACKER

Figure 2:
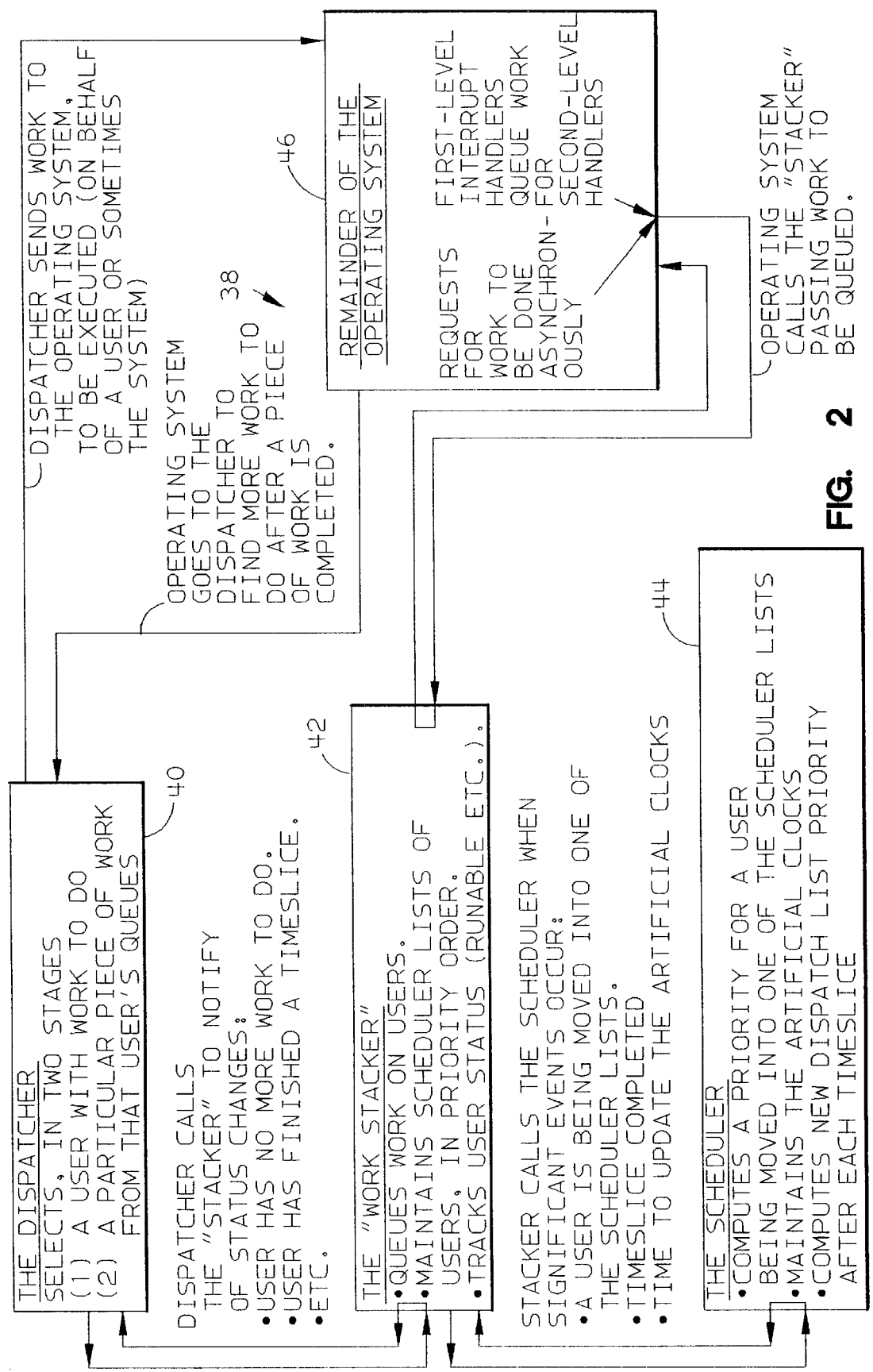
FIG. 2 is a flow diagram of the computer system of FIG. 1.

FIG. 2 illustrates that operating system 38 comprises a dispatcher 40, stacker 42, scheduler 44 and remaining functions 46. The stacker is the interface between the scheduler and the dispatcher and between the dispatcher and scheduler and the remainder of the operating system. The following is a high level description of the flow of processing. In a typical scenario, a user makes a request to the operating system "remainder" 46 to perform some work. The work request is passed to the stacker 42 which records the status of the user as "ready". The stacker views the work arriving from the user as one or more "transactions" even though the user may have a different view of its work. A "new" transaction begins when a user goes from a state of total idleness ("idle") to a state of being ready to execute ("ready"). There is also a third state of "suspension" which exists when a user still has work (a transaction) in progress, but is waiting for a virtual I/O request to complete and therefore is temporarily not ready to execute. Periods of suspension are not sufficient grounds to declare a new transaction. Next, the stacker passes the request to a work queue for this user. The stacker also calls the scheduler to obtain information indicating the dispatch priority of this user in relation to other users on the dispatch list. Then, the stacker places this user (actually the user's VMDBK) in a dispatch list and returns to the "remainder" of the operating system. The dispatch priority effects the ordering of users on the dispatch list. When the remainder of the operating system completes its current piece of work, it transfers control to the dispatcher to determine the next user and piece of work to execute. The dispatcher then selects the first, ready user in the dispatch list and the first piece of work in the user's work queue to be dispatched next. Then, the dispatcher transfers control to the remainder of the operating system to begin executing this work. The dispatched work is then executed for a time slice of predetermined duration, for example, one millisecond. If the work item completes before the one millisecond time slice ends, the dispatcher selects another piece of work from the work queue of the same user to execute. At the end of this time slice, if the user still has work to do, the dispatcher calls the scheduler again to obtain a new priority for the next time slice for this user. This new priority causes the user to be repositioned in the dispatch list, which in turn determines when this next time slice begins for the same user. The time between successive time slices for the same user determines in part the share of processor time for this user.

The following is a more detailed description of various components in system 10:

TIME SLICES

All users are dispatched and executed for discrete time slices of uniform duration, regardless of their absolute or relative shares. In the foregoing example, each time slice is one millisecond. After each user (represented by a VMDBK) completes a time slice, it is interrupted and moved downwardly in the dispatch list (re-prioritized). This generally permits another user to use this processor. Each user's share of the processor is determined by the interval between the time slices allocated to the user and the time required for the user to utilize each time slice; each user does not necessarily consume a single time slice in one continuous millisecond. If the user must wait for an I/O operation, it is temporarily suspended and taken off the processor (but remains in the dispatch list) so that the time waiting for the I/O operation to complete does not count toward this user's time slice. For example, even though an I/O operation may require several milliseconds to complete, an I/O-bound user will often be able to initiate and wait for completion of ten or more I/O operations before using up a single time slice. Also, if work arrives for another user with higher priority, the dispatcher may remove an executing user from its process before the end of the user's time slice and suspend it for a period. The operating system can control the actual share of processor time of each user by controlling the interval between time slices. The interval between time slices for a user corresponds inversely to the magnitude of the share of the user in the dispatch list compared to those of other users in the dispatch list from moment to moment. Each time a VMDBK completes a time slice, only that one VMDBK is re-prioritized and re-positioned in the dispatch list. In the cases where a single time slice is used in pieces, the scheduler does not recompute the user's interval between time slices until the accumulated time equals the one millisecond time slice. The technique for determining the nominal interval between time slices is described in more detail below.

DISPATCHER

The operating system transfers control to the dispatcher whenever a piece of work has been completed by a processor because it is then time to find more work to be performed by the processor. In an N-way multiprocessor (MP) system, the N CPUs all get their work from the one, re-entrant dispatcher 40. Dispatcher 40 is a two-level dispatcher and the work to be dispatched is queued at two levels. The dispatch list of users/VMDBKs is the queue for the first level. There may be more than one piece of work waiting to be done for each VMDBK, and each VMDBK serves as anchor for a second level queue of work requests for that VMDBK. Thus, dispatching occurs in two steps. First, a VMDBK is selected to be dispatched, and second, the VMDBK's work queue is examined to identify a particular piece of work to be dispatched.

RUNLISTS

To reduce the search time for the dispatcher at the first level, there are additional "runlist" queues, one for each of the real CPUs. The VMDBKs in the dispatch list are divided up among the runlists of the several CPUs (although the VMDBKS remain also on the dispatch list). Only the "ready" VMDBKs are put in the runlists, the "suspended" VMDBKs are not. Therefore search time through the runlist is reduced. The VMDBKs in each runlist are ordered by dispatching priority just as they are in the dispatch list. Generally, the dispatcher selects the first VMDBK from the front of the CPU's runlist because there are no "suspended" VMDBKs on the runlist, and the first VMDBK in the runlist is the one with the highest dispatching priority. While the relative priorities are readily observed within each runlist, additional steps are taken to globally cause the highest priority work to be executed before lower priority work. This means that the high priority work must be distributed generally evenly across all of the runlists. Also, if a runlist becomes empty of tasks, then some VMDBKs will be transferred from another runlist.

CLOCKS

Each CPU in the N-way MP system has a time-of-day (TOD) clock and a CPU timer. The TOD clock comprises a fifty-two bit hardware register which is incremented once every microsecond. The TOD clock is set when the operating system is initialized (booted) and is never altered after that. On an N-way MP system, all N of the TOD clocks are synchronized with each other exactly to the microsecond. The TOD clock is set such that time zero is midnight on Jan. 1, 1900. With a 52-bit TOD clock (i.e., bits 0–51) counting microseconds, the clock can run for over 140 years before it repeats. The TOD clock never stops, and always increases and is a reliable and accurate time stamp and measure of real time.

The CPU timer comprises another fifty-two bit hardware register which is used by the operating system 38 for timing each time slice. The CPU timer stops running if and when the system operator stops the CPU, and it starts again as soon as the operator restarts the CPU (whereas the TOD clock runs continuously). The advance of the CPU timer and time slice resumes when the CPU is started up again. When each user begins its time slice, the starting time is noted from the CPU timer. Similarly, each time the user becomes suspended, the time of the CPU timer is noted to determine how much of the time slice remains for this user when it executes again. Thus, the user being processed when the CPU stops, and being measured against the CPU timer, does not lose any of its time slice entitlement.

The scheduler also has a software clock known as the artificial time-of-day (ATOD) clock (and also a second artificial time-of-day clock ATOD2 described later). The ATOD clock is similar to the hardware TOD clocks, except that there is only one (not one per CPU) and it runs slightly slower. A certain amount of the total available processing power of the CPUs is expended on operating system overhead which cannot be attributed to any particular user. Therefore, this amount of the total processing time is unavailable to be divided up as users' shares. The percentage of the total processing that is system overhead varies from moment-to-moment, making it difficult to know how much less than 100% is available for users' shares. This difficulty is circumvented by defining the ATOD clock to be stopped while the operating system is performing overhead functions, and then using ATOD time rather than TOD time in the calculations that deliver shares to users. In the ATOD clock then, time stops while overhead is performed. Thus, 100% of the time measured by the ATOD clock corresponds to usable processing. The calculations for delivering shares, being based on the ATOD clock, can therefore calculate as if 100% of the processing is available for users' shares.

TIME OF DAY AGING AND PRIORITY NUMBERS

When a user is assigned a share of processing time, operating system 38 attempts to give the user at least that share of processor time over time and also attempts to give the processor time when needed to complete the user's processing in a timely manner (while respecting other user's similar needs). As noted above, I/O bound users will require a much longer time than each time slice to utilize its time slice. However, CPU bound users will utilize each time slice in an amount of time equal or slightly larger than the time slice. It is especially important to provide processing time to the I/O bound users when ready; otherwise the I/O bound users will run very slowly. Thus, operating system 38 "pushes" the I/O bound users harder than CPU bound users, i.e. provides a CPU to each I/O bound user as soon as possible after it is ready to execute.

In operating system 38, the lower the priority number the higher the actual priority. Priority numbers are ever changing for each user and dispatch order is based on the relative priority numbers between the ready users. Priority numbers are computed by the scheduler based on the respective absolute or relative share when a user/VMDBK is put in the dispatch list. When computed for a user just entering the dispatch list, the priority number typically is slightly larger (by a few milliseconds) than the current value of the ATOD clock. (However, in actuality, for the first few time slices, a smaller priority number is used to provide a quick response for the user in cases of very short transactions. This alteration is so short as to not materially affect users' shares.) Because ATOD always advances, older, uncompleted tasks usually have a lower priority number and therefore a higher priority than newer tasks, and tend to be located near the top of the dispatch list. As described in more detail below, the dispatcher searches from the top downwardly on the runlist (which as noted above is a copy of the dispatch list excluding nonready or suspended users) to locate a user to execute. As time advances, if a user does not get dispatched because of higher priority ready tasks, or if the user gets dispatched but is I/O bound and spends much time "suspended" without completing its time slice, then the user's priority increases relative to (1) users starting transactions more recently and (2) users who are not as I/O-bound. These two things are true, respectively, because (1) the user's priority number remains fixed until its time slice is completed whereas other users starting new transactions are assigned progressively higher priority numbers as ATOD increases and (2) the more CPU bound users use many time slices and are moved downwardly after each one. Thus, the I/O bound users tend to have higher relative priorities than non-I/O bound users and generally, are positioned near the top of the dispatch and runlist and are quickly provided with a CPU when ready to execute, i.e. after each I/O operation completes.

SYSTEM THROUGHPUT

The "throughput" of a system is the overall amount of work that the system accomplishes. It is quantified by first determining, for each user, the percent of work that this user actually accomplishes versus the amount of work that this user would have accomplished if it had a dedicated CPU or executed without interference or preemption from any other user. Then, the throughputs for all users are summed to determine the overall system throughput. It should be noted that an individual user's personal throughput is not decreased when it is removed from the processor during periods when it is waiting for an I/O operation to complete. In fact, overall system throughput is greatly increased by executing other users during those periods. Also, if the I/O bound users are assigned high relative priorities, their personal and the overall system throughput are improved because with a short amount of processing time when needed to initiate an I/O operation, they can maintain their maximum throughput (as if they had a dedicated CPU).

SHARE CONTROL

The following is a description of the basic process of the present invention. For each user, there is an absolute or relative share (specified in the system directory and sometimes altered by the system operator) as in the prior art VM/ESA operating system. The present invention differs from the prior art VM/ESA operating system in the allocation of unused processor time. According to the present invention, for each user there is also a specified "soft limit", "hard limit" or "no limit" which is not found in the prior art VM/ESA operating system which allocates all excess processor time to the user with the highest absolute or relative share. In the present invention, the unused processing time is allocated generally as follows. As unused processing time becomes available, all users begin to receive excess processing time in proportion to their absolute shares and relative shares computed as if there was no unused processing time. However, when any hard limit user reaches its hard limit, no further allocation is made. No hard limit user can ever be allocated a share of processing time which exceeds the hard limit. When any soft limit user reaches its soft limit, no further allocation is made to this soft limit user if any other soft limit user has yet to reach its soft limit or any other hard limit user has yet to reach its hard limit or if there are any unlimited users capable of using the excess processing time. The other soft limit and hard limit users who have not yet reached their limits continue to receive extra shares until they also reach their respective limits. When all other soft limit users have reached their soft limits and all hard limit users have reached their hard limits and if there are no unlimited users capable of using the excess processing time, then the soft limit user with the greatest absolute share or relative share (computed as if there was no unused processing time) receives all the remaining unused processing time. (In an alternate embodiment of the present invention, when all soft limit users have reached their soft limits and all hard limit users have reached their hard limits and if there are no unlimited users capable of using the excess processing time, then all soft limit users share the remaining unused processing time in proportion to their absolute shares or relative shares computed as if there was no unused processing time.)

As described in more detail below, the share allocation technique of the present invention is implemented by re-positioning or offsetting each user downward in the dispatch list after the user completes each time slice. The amount of offset is based on the magnitude of the absolute or relative share. The present invention also takes into account the relative amount of I/O boundness of each user when repositioning the user in the dispatch list after completing a time slice. This is done by starting the offset from the position of the user just before completing the time slice. Thus, if the user is very I/O bound, it will be located very near the top of the dispatch list before completing its time slice, and therefore will be repositioned high in the dispatch list even after completing the time slice and undergoing the downward offset. (When a user first enters the dispatch list, the offset is started from the vicinity of ATOD.)

Figure 3B:
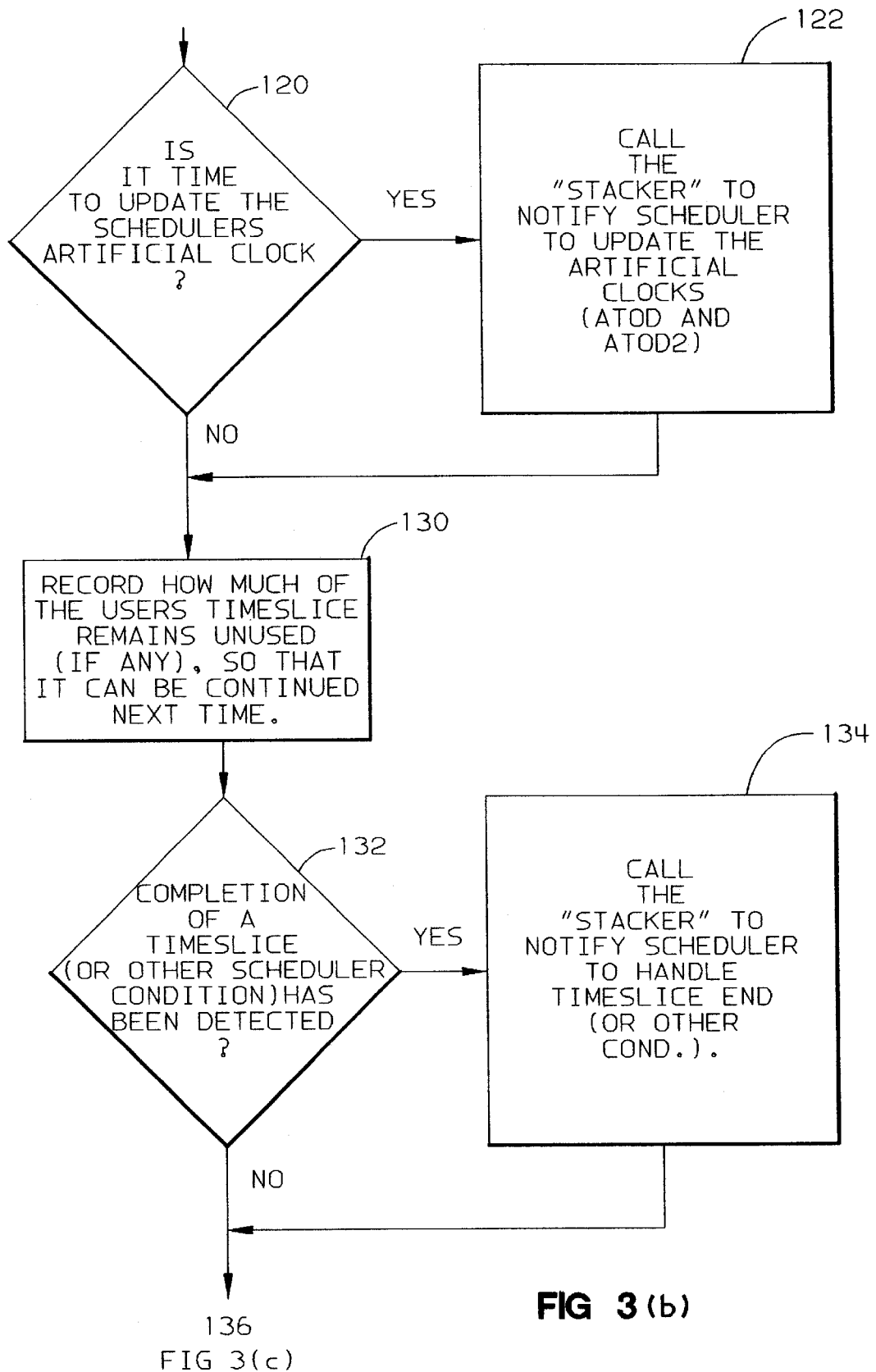
FIGS. 3(a–c) form a flow chart of a dispatcher within the computer system of FIG. 1.
Figure 3C:
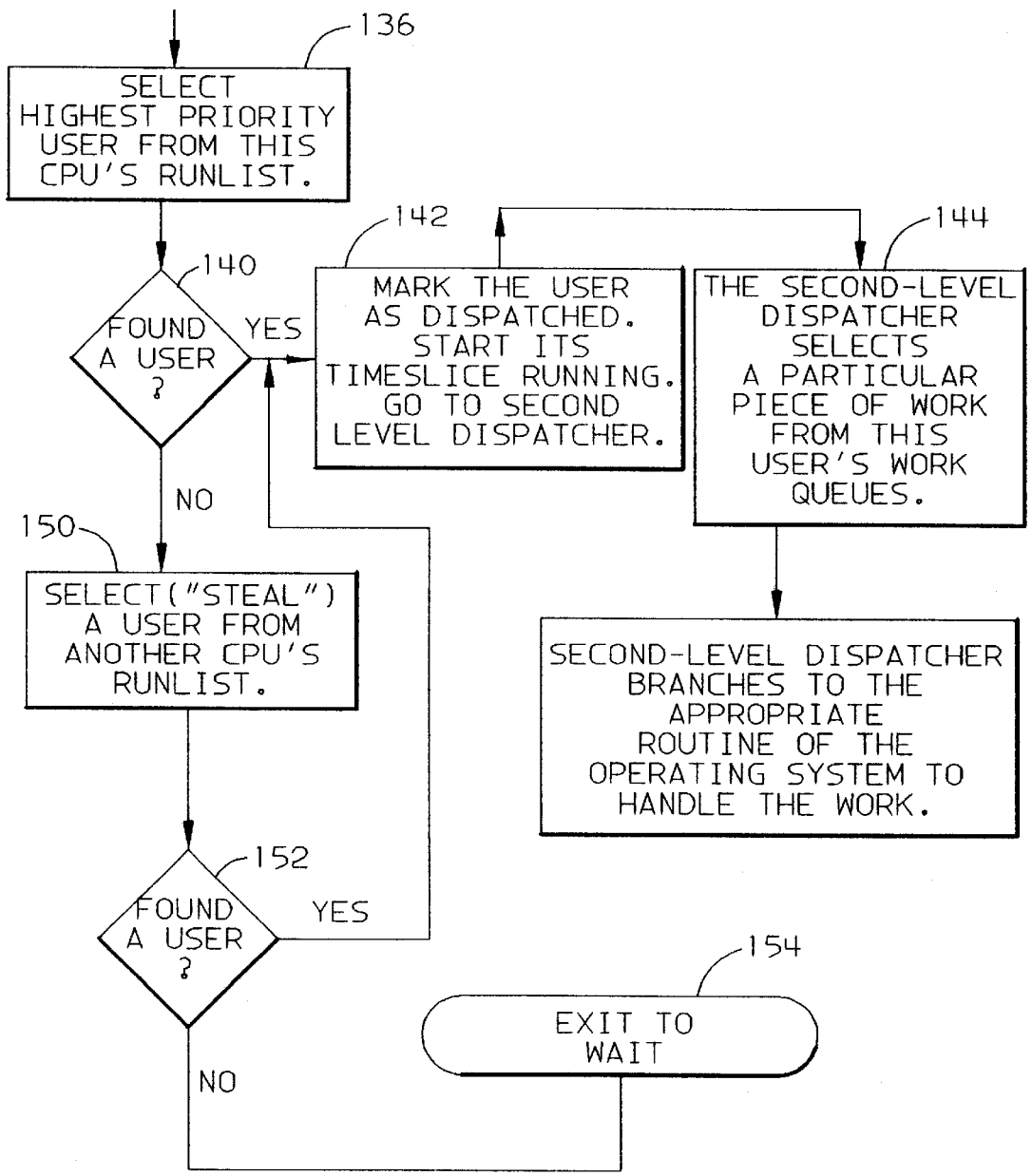

The following is a more detailed description of the present invention. Dispatcher 40 is implemented as illustrated in FIGS. 3(a–c). In step 100, a CPU completes execution of a piece of work for a user and so notifies the dispatcher. In response, the first level of the dispatcher determines if the user has completed its current one millisecond time slice (decision 102). If not, then the first level dispatcher determines if a higher priority user is waiting for the processor (decision 104). If not, then the first level dispatcher determines if the user that just completed one piece of work has another piece of work to perform, i.e. another piece of work in its work queue (decision 106). If so, then the first level dispatcher calls the second level of the dispatcher to dispatch the next piece of work from this user's queue for execution on the same CPU that just completed the other piece of work for this same user (step 110). In response, the second level dispatcher selects the first piece of work on this user's work queue and transfers control to the appropriate routine in the operating system for handling this particular piece of work (step 112).

Referring again to decisions 102, 104 and 106, if decision 102 is yes, decision 104 is yes or decision 106 is no, then the first level dispatcher proceeds to decision 120 to determine if it is time to update the scheduler's ATOD clock (and ATOD2 clock) as described below. This decision is based on whether or not at least one millisecond has elapsed since the last update of the clocks. If so, the dispatcher calls the stacker to notify the scheduler to update the ATOD and ATOD2 clocks (step 122). Next, the first level dispatcher "undispatches" the user by first recording how much, if any, of the user's time slice remains unused (step 130). If decision 102 lead to step 130, then nothing of this time slice remains. However, if step 130 was preceded by either decision 104 or decision 106 then some amount of the time slice remains. Next, the first level dispatcher determines if the time slice has been completed (and any of several other scheduler conditions such as whether the user should be cycled back to the eligible list are checked) (decision 132). If so, the first level dispatcher calls the stacker to notify the scheduler to handle the end of time slice or other scheduler condition (step 134). Next, the first level dispatcher selects the highest priority user from the runlist of the CPU that just completed execution of the transaction (step 136). If there is such a user (decision 140), then the first level dispatcher marks this user as dispatched, loads the time slice (or remainder thereof) into the CPU timer in order to time the time slice for this user and then goes to the second level dispatcher (step 142). In response, the second level dispatcher selects the first piece of work for this user from the user's work queue and transfers control to the appropriate routine in the operating system portion 46 for handling this particular piece of work (step 144).

Referring again to decision 140, if no user was found for the CPU that just completed execution of the transaction, the first level dispatcher selects the highest priority user from another CPU's runlist (step 150). If such a user is found (decision 152), the first level dispatcher proceeds to step 142 to dispatch this user from the other CPU's runlist. However, if no such user is found on another CPU's runlist, then the first level dispatcher proceeds to a wait state (step 154).

Figure 4:
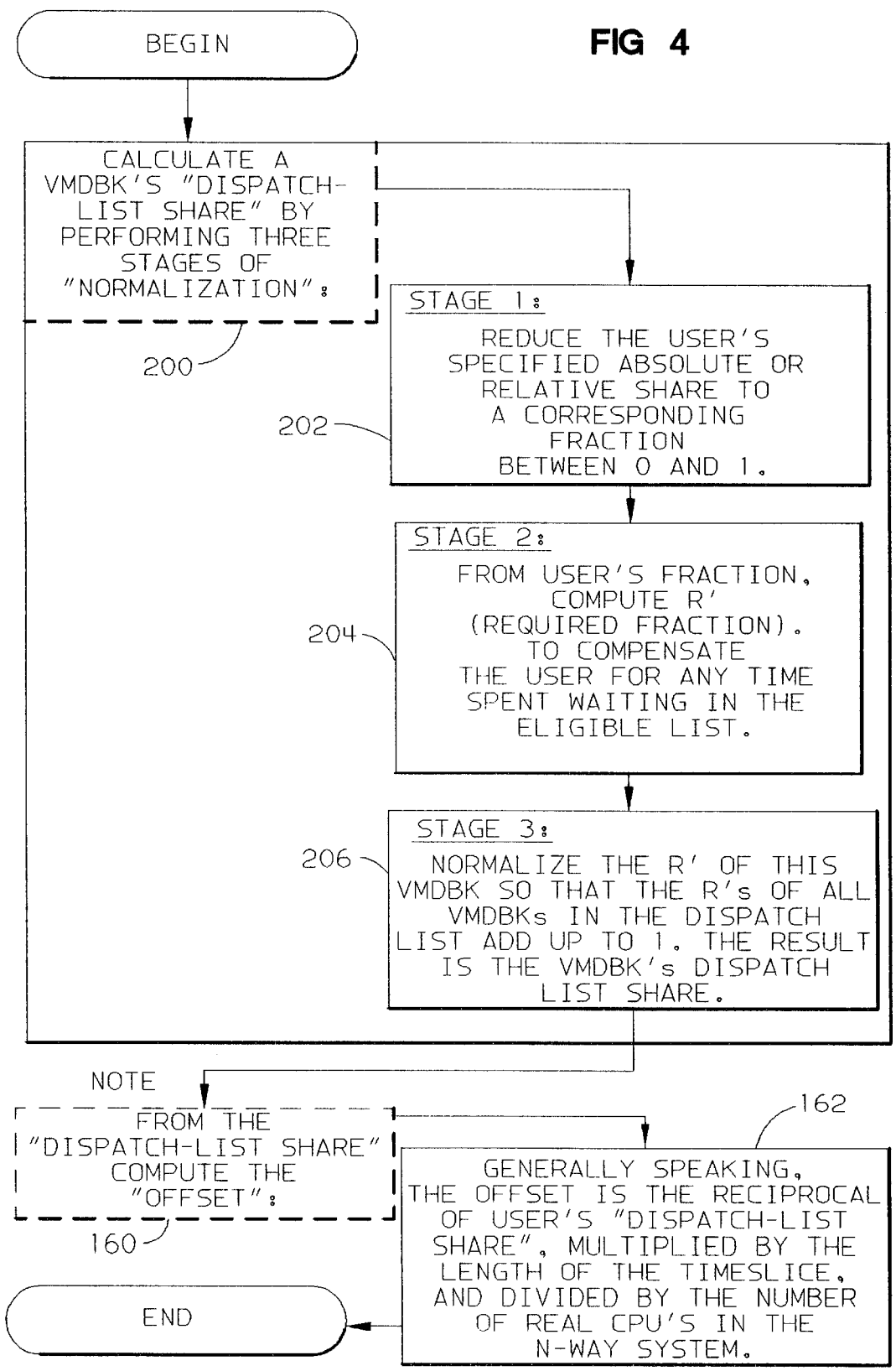
FIG. 4 is a flow chart of (a small portion of) a scheduler within the computer system of FIG. 1.

FIG. 4 illustrates a portion of the scheduler 44. After receiving from the second level dispatcher (via the stacker) the identification of the new user to be scheduled, the scheduler determines a "dispatch list share" (step 200) as follows. In step 202, the scheduler converts the user's absolute or relative share to a fraction of the system's processing time in the manner described above for the prior art VM/ESA operating system i.e. all absolute shares are taken off the top (and reduced proportionally if the total is greater than ninety nine percent) and the remainder is divided amongst the other users on the dispatch list in proportion to their relative shares. The result for each user is a fraction of the processor time (between zero and one) and the values of all user's add to one. Next, the scheduler determines this user's "required fraction" (R') in order to compensate the user for any time spent waiting in an "eligible" list (step 204). A user is put in the eligible list when it is ready to execute, but there is insufficient memory available to execute the user's work. The required fraction is determined by multiplying the share fraction determined in step 202 by (time in dispatch list+time in eligible list)/(time in dispatch list). The required fraction for each user is recomputed after each stay in the eligible list and the result is used for the next period in the dispatch list. However, usually there is sufficient memory for all users so the "trips" to the eligible list are rare and usually, step 204 is a simple multiplication of the result of step 202 by one. Next, the scheduler normalizes the required fraction R' of this user so that the required fractions of all users in the dispatch list add to one (step 206). The user's normalized required fraction is the "dispatch list share" (or runlist share) and is described in more detail below. From the dispatch list share for this user, the scheduler determines an "offset" down the dispatch list and runlist. Roughly, the user's offset is the reciprocal of the dispatch list share multiplied by the length of the time slice and divided by the number of real CPUs in the system. The smaller the offset the more access the user has to a CPU, and vice versa. The precise value of the user's offset is described in more detail below.

FIG. 5 illustrates a dispatch list 300 at an instant in time. The dispatch list includes the users which are ready to execute and the users which are suspended. As noted above, the users on dispatch list 300 which are ready to execute are also listed on a runlist to reduce searching time, but illustration of dispatch list 300 is better for purposes of explanation. The dispatch list is searched from top downwardly; the user with the highest priority (and lowest priority numbers) are listed at the top in order. When each user completes its time slice, if it has more work to do, the scheduler repositions the user on the dispatch list 300 (and indirectly on the runlist) downwardly from its current position an amount equal to the offset for this user. Thus, two factors effect the distribution of users on the dispatch list 300. The first factor is the magnitude of the offset. As noted above, the magnitude of the offset for each user is inversely related to its share in relation to the shares of the other users on the dispatch list and differs from other users with different shares. Thus, the smaller the share, the greater the offset. This tends to position the low share users near the bottom of the dispatch 300 for most of the time. The second factor is the amount of real time required by the user to complete its time slice. "I/O bound" users require substantial I/O time to complete a time slice because they and their time slice time are suspended for considerable time waiting for I/O operations to complete after the user initiates them. Therefore, I/O bound users require considerably longer real time than the one millisecond time slice to complete their time slice of execution and once an I/O bound user rises to the top of the runlist 300, it will remain there a considerable time before completing its time slice and being offset downwardly. Conversely, "CPU bound" users require little I/O time and complete their time slice nearly continuously in one millisecond or slightly longer. Therefore, CPU bound users are frequently offset downwardly and generally reside near the bottom of the dispatch list.

Thus, at any instant, the I/O bound users and other users with very large shares tend to be located near the top of the dispatch list and CPU bound users and users with very small shares tend to be located near the bottom of the dispatch list. Of the two factors, share and I/O vs. CPU boundness, the amount of I/O vs. CPU boundness has a greater effect on the position in the dispatch list (for the normal range of shares). The positioning of the users on the runlist in the manner described above yields a high throughput because when an I/O bound user becomes ready to execute, i.e. the last I/O operation completed, the user is likely to be located near the top of the runlist 300 and will obtain a CPU quickly.

In FIG. 5, these offsets are shown as the downwardly-sweeping arrows at the left. Some offsets are longer or shorter than others because different users have different shares. In a typical situation, all users below the current ATOD mark are CPU-bound, while all users above the current ATOD mark are I/O-bound. The users get sorted out that way due to the effects described above. Also, the dispatcher will generally not need to search much below the current ATOD mark to find a ready user because the CPU-bound users near there can almost always be dispatched. Thus the "offset" arrows on the left side of FIG. 5 at and below the ATOD mark will generally tend to originate from users at or slightly below the ATOD mark. However, in the upper part of the dispatch list, above the ATOD mark, the arrows tend to originate anywhere. Note that when an I/O-bound user completes a time slice, because of its typical high priority and high position at the time of the previous time slice, it does not usually move to the bottom of the list, and usually still remains above the ATOD mark. Thus, an I/O bound user is likely to get dispatched again immediately after completing an I/O wait, and high throughput is maintained.

The foregoing scheduler "pushes very hard" on users who have difficulty absorbing their shares. As one of these users falls farther and farther behind on its assigned share, it rises higher and higher in the dispatch list until finally, if there is any hope of this user taking its full share it will do so. Thus the foregoing scheduler does not merely give desired ACCESS to each user to a CPU, but it is effective in giving much of the desired SHARES to each user of the CPU.

It should be noted that the present invention is effective in providing the desired shares without calculating a history of the consumption of each user. This is because the "history"

resides in the user's dispatch list position. The user's position in the dispatch list relative to the ATOD mark represents the share of processor time that the user has received in the past relative to what the user deserves. If the user has gotten exactly what it deserves until now, then the user will be located exactly at the ATOD mark. If the user is above the ATOD mark, then the user has received less than what the user deserves. If the user is below the ATOD mark, then the user has received more than what the user deserves.

STEP 206—NORMALIZATION OF SHARES

The required fraction R' determined in step 204 is normalized in step 206 as follows. There are three different normalization cases and two variations of each case. In all three cases, the calculation is based on either the sum of the required fractions for all users on the dispatch list (SRMRTHRU) or just those users below the ATOD mark (SRMCTHRU). In the second and third cases, in order to enforce the limits as described above, the VMDBK is considered differently depending on whether or not it is found to be hitting its (hard or soft) limit. The sum of the R's of all users in the dispatch list is represented by:

$$SRMRTHRU=SRMRTHRN+SRMRTHRL+R'$$

where SRMRTHRN is the sum of the required fractions of all users in the dispatch list which are either unlimited or have not hit their limits, and SRMRTHRL is the sum of the required fractions of all users in the dispatch list which have hit their limits, and where the R' shown being added represents R' of the one user currently being considered and which, at the time of calculation, has not been added into either SRMRTHN or SRMRTHL yet. Similarly, for the sum of just the users below the ATOD mark:

$$SRMCTHRU=SRMCTHRN+SRMCTHRL+R'$$

where SRMCTHRN is the sum of the required fractions of users below the ATOD mark which are either unlimited or have not hit their limits, and SRMCTHRL is the sum of the required throughputs of users below the ATOD mark which have hit their limits. (The letter "C" in each of these variables is a reminder that the users below the ATOD mark can be regarded as CPU bound.) In the calculation below (for the three cases) only the SRMRTHRN and SRMRTHRL variables are shown, however, it is important to note that the variables SRMCTHRN and SRMCTHRL are intended to be substituted if the user being examined is one who is below the ATOD mark. This accounts for the two variations mentioned earlier of each of the three cases.

First Case:

If ((SRMRTHRL+SRMRTHRN+R')>1 AND SRMRTHRL>0.5), then, some user's shares have to be made smaller and because the users hitting their limits make up a large part (>0.5), they are all included in the reduction this time. Then, the current user is normalized as follows:

$$\text{Normalized } R'=R'/(SRMRTHRL+SRMRTHRN+R')$$

Thus, the current user's share becomes smaller.

Second Case:

If ((SRMRTHRL+SRMRTHRN+R')>1 but SRMRTHRL<0.5), then some users' shares have to be made smaller. But the users hitting their limits don't amount to much (their R's sum to <0.5), so they are not normalized. Then the current user's share is adjusted as follows only if the current user is not hitting its limit.

$$\text{Normalized } R'=R'*(1-SRMRTHRL)/(SRMRTHRN+R')$$

Thus the share of a user which has not hit its share becomes smaller. However, a current user which has hit its share uses the following:

$$\text{Normalized } R'=R'(\text{limit})$$

where R' (limit) is the normalized fraction of the specified hard limit or soft limit, i.e. the hard limit or soft limit adjusted for the effects of the eligible list time. Because the normalized fraction is limited for a user which has hit its limit, this limits the share of such users at their respective limits as long as there is at least one user which has not yet hit its limit or at least one unlimited user.

Third Case:

If ((SRMRTHRL+SRMRTHRN+R')<1.0), then, some users' shares should be made larger. Because the shares of the users which have hit their limits should not be made larger, adjustments are made only to the users which have not hit their limits. If the current user has not hit its limit, its share is adjusted as follows:

$$\text{Normalized } R'=(\text{Same as case (2) above.})$$

But this time the normal user's share becomes larger (unlike case (2) above). However, if the current user hits its limit, its share is adjusted as follows:

$$\text{Normalized } R'=R'(\text{limit})$$

Because the normalized fraction is limited for a user which has hit its limit, this limits the share of such users at their respective limits as long as there is at least one user which has not yet hit its limit or at least one unlimited user.

The reason that the first and second cases differ is that it is preferable, if possible, not to reduce the shares of limited users because the shares of such users are never increased (see third case). In contrast, a loss of share for an unlimited user will be made up statistically by getting a larger share at other times.

In distinguishing between the first and second cases, a test is made for SRMRTHRL>0.5. The R' of the current user is not considered in both of these cases because the user's share is being made smaller, not larger. It is therefore unlikely to hit its limit. Therefore, such a user is not viewed as hitting its limit when testing to see if such users sum to >0.5.

In the first case, each R' is divided by the sum of all the R's. Thus the resulting values (Normalized R's) will sum to 1. The expression (SRMRTHRL+SRMRTHRN+R') represents the sum of all the R's.

Recall that SRMRTHRL and SRMRTHRN are the component parts (or array elements) of SRMRTHRU and that SRMRTHRU is the sum of the R's. Except that at the point of doing the calculations in the cases above, R' of the current user happened to be subtracted out of SRMRTHRU and it could not be determined which element to add the new R' back into yet. Therefore the expression (SRMRTHRL+SRMRTHRN+R') shows R' being added in explicitly.

In the second case, R' is only adjusted for the users which have not hit their respective limits, whereas the R's for the users which have hit their respective limits remain constant. Thus the R's of the users which have not hit their limits are normalized by dividing by the sum of the R's of all users which have not hit their limits (SRMRTHRN+R') and then multiplying the result by (1−SRMRTHRL). The latter factor is required because the normalized shares of the users which have not hit their limits should not sum to one because there are also users which have hit their limits. Because normalized R's obtained by just dividing by (SRMRTHRN+R') and omitting the multiplier would give values that sum to 1, it follows that after they have been multiplied by (1−SRMRTHRL) they will sum to (1−SRMRTHRL). The R' values included in SRMRTHRL have in fact been set equal to the limit, R'(limit).

DELIVERING EXCESS PROCESSOR TIME

Initial Proportionality

For the following reasons, excess processor time is available, in proportion to their absolute or relative shares, to all users who have not yet reached their soft or hard limit. Graphically, this occurs with the users in the dispatch list advancing (ideally) at the same rate as the ATOD mark. In general, the foregoing mechanism attempts to share processor time in proportion to the absolute and relative shares by setting (or adjusting) the offsets accordingly.

As for users below the ATOD mark, this proportionment results from two characteristics of the foregoing normalization of R' in step 206. As noted above in the description of step 206, the normalization of the required fraction R' for each user below the ATOD mark is based on the sum SRMCTHRU for the set of users below the ATOD mark, excluding those above the ATOD mark. Therefore, this will tend to give the users below the ATOD mark a higher priority, which results from a smaller offset because the denominator of "Normalized R' equation" is smaller, i.e. each user's share appears to be a greater percentage of the total when the total is limited to only those users below the ATOD mark. Meanwhile, although the I/O bound users above ATOD are slow to use their time slices, they do use some of the processor time. Therefore, because less than 100% of the CPU service will be delivered to the users below the ATOD mark, and their offsets are now based on them getting 100%, the users below the ATOD mark will tend to move slowly upward and in fact start to lag behind the ATOD mark. However, lagging behind the ATOD mark will tend to move such users downwardly again in the dispatch list for the following reason. As soon as a user moves above the ATOD mark, it will no longer be in the set of users below the ATOD mark; therefore, SRMRTHRU, not SRMCTHRU, will be used in the denominator of the "Normalized R'" equation. This movement above the ATOD mark will tend to move such users downwardly in the dispatch list again because the denominator of the "Normalized R'" equation will then be larger (resulting in a smaller normalized R', but larger offset). The net effect of these two tendencies to move above and below the ATOD mark is that the "surplus" service will be given out (to users who can use it) in proportion to the installation defined absolute and relative shares. These users advance at the same rate as the ATOD mark, not faster.

The users located high above the ATOD mark are offered as much processor time as they can use, but they cannot generally use much of their share of the excess; not even the full amount of their original share. However, if their condition changes such that they become CPU bound, they will soon fall below the ATOD mark for reasons noted above, and then be governed by the preceding principals which give them the excess processor time in proportion to their installation defined share.

Hard and Soft Limit Enforcement

The foregoing description of the normalization of shares of step 206 explains how a hard or soft limited user will be limited to their respective limits provided there is (below the ATOD mark) at least one other user which has not hit its limit or at least one unlimited user. The following describes how a hard limit user is prevented from receiving a share greater than its hard limit, and how all excess processor time remaining after all users have hit their respective limits is allocated to the soft limited user with the greatest share.

As noted above, when a user completes a minor time slice it is moved downwardly in the dispatch list by one offset calculated in step 160. But before being moved, a determination is made whether this would move it past a MAXFALL limit. The MAXFALL limit for each user is equal to four times the offset for the user, i.e., four offsets beyond the ATOD mark. If an unlimited or soft limited user would move past the MAXFALL limit due to its respective offset, it is moved downwardly to its MAXFALL limit and not beyond. The MAXFALL limit enables the unlimited and soft limited users to get more than their share because it will result in a positioning higher in the dispatch list than their shares dictate otherwise. In fact, when all users have hit their limits and there are no unlimited users, the soft limited user with the greatest share will obtain substantially all remaining excess processor time because such a user will have the smallest offset and therefore the smallest MAXFALL limit. This will position such a user above the other soft limited users in the dispatch list and give such a user all the excess processor time that such a user can utilize.

However, hard limited users will not be limited by the MAXFALL limit although when falling below the MAXFALL limit, the hard limited user will be moved from the runlist to a limit list. The limit list is ordered according to user priority (VMDLPRTY). Therefore when a hard limited user falls below the MAXFALL limit, it generally will not complete any more minor time slices or move further downward in the dispatch list. This will prevent the hard limited user from obtaining any processor time in excess of its specified limit because the dispatcher does not dispatch users who are in the limit list (while a user is in the limit list it is not allowed to enter a runlist).

Users are removed from the limit list after they have spent enough time there such that they are no longer ahead of schedule. This is accomplished as follows. A second "artificial time-of-day" clock "ATOD2" is formed. This ATOD2 time will advance both in proportion to productive CPU service given to users and in proportion to wait time. When ATOD2 reaches the limit list deadline of a user at the head of the limit list the user will be removed from the limit list and put back in a runlist. To give the user time to complete a time slice by the time the deadline arrives, the user is entitled to leave the limit list one time slice prior to its deadline. Meanwhile the existing ATOD will continue to be used to establish a starting dispatch list priority for users entering the dispatch list, and to calculate the MAXFALL limit. In other words, ATOD serves as the "deadline" for the dispatch list and runlists.

Occasionally a user will experience an excessively long I/O wait due, for example, to an I/O device which requires human intervention before it can continue. Consequently, the user will be located extremely high on the dispatch list, well above other users. This is problematic when the user starts to run again because if the user turns CPU-bound, all other users will be prevented from running until the user moves down past them, and that could take too long if the user is very high and if the normal offsetting mechanics were depended upon to bring the user down. Therefore, the following mechanism is used to detect such users and to offset them downwardly enough to position them in the vicinity of other users who are high on the dispatch list but have not experienced such excessive I/O waits. Whenever a "nonsuspect" user (i.e. a user which is not yet suspected of being excessively I/O bound) completes a time slice, the user is moved downwardly by one offset as described above. However, if the user does not pass another "nonsuspect" user during this movement, the moving user is designated as "suspect". (This is done by setting a bit associated with the moving user.) The next time that this suspect user completes a time slice, the suspect user is moved downwardly by the normal offset and if the user passes a "nonsuspect" user during this movement then the moving user is marked as "nonsuspect" again; otherwise, the moving user is moved further downwardly until just above the first "nonsuspect" user that the moving user encounters. In addition, all users below the ATOD mark are "nonsuspect".

ATOD and ATOD2

The ATOD clock advances in proportion to the available usable CPU time. System time (overhead) is not usable toward users' tasks or shares and therefore, does not count toward advancing ATOD. Each executing CPU regularly increments ATOD; waiting CPUs do not. This is driven by the dispatcher at steps 120 and 122. ATOD advances according to how much user-time has been delivered by the several real CPUs since the last increment. That is, each CPU increments ATOD in proportion to the advancement of that CPU's actual user execution time accumulator (PFXUTIME). The intent (when all CPUs are running productively) is for ATOD to advance approximately at real time (wall clock time or TOD). When all N CPUs are running, each CPU is generally advancing its own PFXUTIME at nearly real time. Therefore the contributions of the N CPUs are divided by N.

$$ATOD=ATOD+(\text{delta of PFXUTIME})/N$$

where "delta of PFXUTIME" is the change in this CPU's PFXUTIME accumulator since the last time it was checked.

ATOD2 includes each CPU's user-time (PFXUTIME) and each CPU's wait time (PFXTOTWT):

$$ATOD2=ATOD2+(\text{delta of PFXUTIME}+\text{delta of PFXTOTWT})/N$$

where PFXUTIME and PFXTOTWT are both doubleword clocks similar to the CPU Timer.

However, when any CPU is waiting for several successive intervals, then another executing CPU will act on its behalf to make contributions of wait-time to ATOD2 (and under some circumstances to ATOD also). It is assumed that such a waiting CPU is spending all of its time in wait state and, for wait state, its contribution to ATOD2 should be the same as the advance of real time (as measured by the TOD clock). However, no assumptions or contributions are made by another CPU for execution time of the waiting CPU. When such a waiting CPU begins to execute again, it will make its own contribution to ATOD in the normal manner and to ATOD2 for just the final, possibly fractional, interval according to real time. (The other CPU has taken care of prior intervals.)

As noted above, some wait-time is counted toward ATOD when there are one or more CPUs waiting for several successive time slice intervals, and at the same time the current CPU does not have any work (VMDBKS) in its runlist. If the current CPU had work in its runlist then it is likely that the waiting CPUs are not "usable" to do that work, otherwise they would in all likelihood, already be doing the work. Conversely, if the current CPU does not have any work in the runlist, it will be fairly safe to count a waiting CPU as if its wait-time is usable time. Therefore, when there are one or more CPUs in extended wait mode and at the same time the current CPU does not have any work in its runlist, the current CPU uses the following formula instead of the previous one.

$$ATOD=ATOD+(\text{Delta}/N)+(\text{Delta}/N)*TRKCT/(N\text{-}TRKCT)$$

where ATOD =ATOD +(Delta/N) represents the original formula with "Delta" being shorthand for "delta of PFXUTIME", and "(Delta/N)*TRKCT/(N-TRKCT)" is the term added to account for wait-time with "Delta" again being shorthand for "delta of PFXUTIME" (and not "delta of PFXTOTWT"). TRKCT is SRMTRKCT, the count of CPUs currently still in extended wait mode.

If the waiting CPUs were allowed to (eventually) make contributions for their own wait times, the contributions would arrive in big lumps. But, using the formula above, the acting CPU makes contributions on behalf of the waiting CPUs of a size no larger than its own (CPU-based) contribution. Thus the basic size of the contribution in the second term is represented by Delta/N and is multiplied by SRMTRKCT to contribute for the several extended-wait mode CPUS. But then the result is divided by (N-SRMTRKCT) because there are this many other CPUs like the current one (i.e., not in extended-wait mode) which, like the acting one, will make a contribution just like the acting CPU.

The SRMTODSV timestamp is a good approximation of the current TOD although it is only updated intermittently—at every minor time slice end (and other scheduling points) and whenever a VMDBK is made ready, i.e., following most I/O operations. Although SRMTODSV is accurate enough for deciding whether or not it is time to update ATOD, once that decision is made, a more accurate TOD value is used.

As noted above, wait-time of a CPU is not always included in ATOD because otherwise ATOD could advance faster than the users and then the "suspect/nonsuspect" mechanism described earlier (which serves to limit how high users can be in the dispatch list) would advance all the users uniformly, without regard to their shares. Nevertheless, the total exclusion of wait-time from ATOD causes a problem if only one (or a few) of a system's several CPUs is running, and the others are usually waiting. In such a case, ATOD will lag behind and not advance in proportion to real time. That is not a problem in the case of unlimited and soft limited users or small share, hard limited users, but would cause a noticeable discrepancy for large share, hard limited users. This is because users with small shares take such big steps downward in the dispatch list after completing a time slice that modest differences between ATOD and TOD are not significant. But for hard limited users with large shares (and corresponding small offsets), accurate motion of ATOD is important. ATOD should follow along behind the user with a large SHARE at a relatively rapid pace so that the user does not outrun it too quickly, hit the MAXFALL limit, and get put in the limit list prematurely. If this were allowed to happen, the system would display the following undesirable characteristic that a hard limited user on a busy system would get its share, but on an un-busy system (especially when it is alone on the system) it would get less than its share. This is prevented from happening by including the wait-time (or some of it) in ATOD when there is substantial wait-time and the wait-time can be proven to be "usable" for the existing work. As noted above, when there are CPUs waiting and the current CPU does not have any work in its runlist, then wait time is included in ATOD. The current CPU contributes to wait time on behalf of the waiting CPUs. Over-contributions of wait time could be harmful as it could cause the "suspect"/"nonsuspect" mechanism to advance all users uniformly, disregarding their shares. By making the contributions equal to no more than the amount of CPU time (delta of PFXUTIME) that the current CPU is using, a full contribution is made when it counts, i.e., when there is CPU-bound work and the likelihood that a user will get put in the limit-list, and a lesser contribution is made when the CPU is not so busy.

TRANSLATIONS BETWEEN ATOD AND ATOD2

Because users in the runlists and the limit list are timed with different clocks (ATOD and ATOD2) that run at different rates, a translation is performed when a user is moved into or out of the limit list. While a user is in the limit list, the user has two priorities—a dispatch list priority (VMDDPRTY) and a limit list priority (VMDLPRTY). The limit list priority is derived from the user's dispatch list priority. The intent is that as the user begins its "delay" in the limit list, the user should have the same displacement from ATOD2 as it has from ATOD. That displacement represents the amount of delay that should pass before the user is due to run again, but the delay needs to be measured on the ATOD2 clock (in order to allow "wait time" to count fully). Therefore the translation is:

$$VMDLPRTY = ATOD2 + (VMDDPRTY - ATOD)$$

This computation of VMDLPRTY is done when the user enters the limit list. When the user leaves the limit list, the user should enter a runlist one minor time slice prior to the user's deadline. Therefore (by definition) when a user is moved to a runlist from the limit list, the user's VMDDPRTY is set to (ATOD+TS) with compensation noted below for some slight delay beyond the limit list deadline before noticing the user and getting the user moved:

$$VMDDPRTY = (ATOD + TS) - ((ATOD2 + TS) - VMDLPRTY)$$
$$= VMDLPRTY + ATOD - ATOD2$$

I claim:

1. A method for allocating processor execution time in a computer amongst a multiplicity of users, said method comprising the steps of:
   specifying to the computer, shares for respective CPU bound and I/O bound users;
   executing the I/O bound users with processor time less than their respective, specified share(s) by not using significant processor time on users which are waiting for an I/O operation to complete but expediting allocation of a processor to users after their respective I/O operations complete; and
   after the specifying and executing steps, deriving new share(s) for at least some of the CPU bound users based on a computation of the specified share for each of said some CPU bound users in relation to a sum of specified shares of other CPU bound users, said sum excluding specified shares of I/O bound users; and
   executing said some CPU bound users based on their respective new shares.

2. A method as set forth in claim 1 further comprising the steps of:
   specifying to the computer, share limits above said specified, respective shares for respective users; and wherein
   the CPU bound user executing step is limited for one of said CPU bound users which has reached its share limit such that said one user does not get significantly more processor time than said specified share limit.

3. A method as set forth in claim 2 wherein the CPU bound user executing step is limited for all of the CPU bound users with respective share limits when said CPU bound users reach their respective share limits such that said CPU bound users do not get significantly more processor time than said respective share limits.

4. A method as set forth in claim 2 wherein some of said share limits are specified as hard limits and other of said share limits are specified as soft limits, said hard limited users not receiving significantly more than their respective hard limits regardless of availability of sufficient processor time to render said hard limited users' respective execution times above their respective hard limits, and at least one soft limit user receiving additional processor time above its respective soft limit when all other soft and hard limited users have reached their respective limits.

5. A method as set forth in claim 4 wherein when all users reach their respective limits, all excess processor time is offered to the soft limited user with the greatest specified share.

6. A method as set forth in claim 1 wherein at least one of said specified shares is an absolute share and some other of said specified shares are relative shares, said absolute shares being absolute shares of total processor time and said relative shares being shares in relation to the other relative shares of a remainder of the total processor time after said absolute shares are subtracted.

7. A method as set forth in claim 1 wherein both of the executing steps comprise the steps of positioning said users on a dispatch list, executing users which are ready to execute and located on the dispatch list, in order, for respective time slices, and after completing each time slice for an I/O bound user, the I/O bound user executing step repositions said I/O bound user later in the dispatch list by an offset based on the respective, specified share in relation to the sum of the shares of all users which have work in progress.

8. A method as set forth in claim 1 wherein both of the executing steps comprise the steps of positioning said users on a dispatch list, executing users which are ready to execute and located on the dispatch list, in order, for respective time slices, and after completing each time slice for a CPU bound user, the CPU bound user executing step repositions said CPU bound user later in the dispatch list by an offset based on the respective share in relation to a sum of shares of other CPU bound users but excluding shares of I/O bound users.

9. A method as set forth in claim 7 further comprising the step of:
   specifying to the computer, share limits above said specified, respective shares for respective users; and
   determining a minimum offset for an I/O bound user with a share limit based on the share limit.

10. A method as set forth in claim 8 further comprising the steps of:
    specifying, to the computer, share limits above said specified, respective shares for respective users; and
    limiting an offset of a share limited, CPU bound user on the dispatch list such that said CPU bound user does not fall an amount below a CPU bound user which is receiving its proportionate share, said amount being based on the offset for said share limited CPU bound user times a predetermined multiplier.

11. A method as set forth in claim 7 wherein each time slice of an I/O bound user is not advanced while the I/O bound user waits for an I/O operation to complete, whereby the I/O bound user maintains a higher position on the dispatch list than if the I/O bound user's time slice were advanced while the I/O bound user waits for said I/O operation to complete.

12. A method as set forth in claim 1 wherein both of said executing steps comprise the steps of positioning said users on a dispatch list, executing users which are ready to execute and located on the dispatch list, in order, for respective time slices, and after a CPU bound user located in a bottom part of the dispatch list completes each time slice, the CPU bound executing step repositions the CPU bound user later in the dispatch list by an offset based on said CPU bound user's specified share in relation to a sum of specified shares of other users located in said bottom part of said dispatch list excluding specified shares of other users located in a top part of said dispatch list.

13. A method as set forth in claim 12 wherein after completing each time slice for an I/O bound user located in a top part of the dispatch list, the I/O bound user executing step comprises the step of repositioning the I/O bound user later in the dispatch list by an offset based on the magnitude of said I/O bound user's share in relation to other users shares throughout said dispatch list.

14. A method for allocating processor execution time in a computer amongst a multiplicity of users, said method comprising the steps of:
   specifying shares of processor time for each of said users;
   positioning the users on a dispatch list;
   executing, in order, for respective time slices, users which are ready to execute and located on the dispatch list; and
   after completing each time slice for a user located in a bottom part of the dispatch list, repositioning said user later in the dispatch list by an offset based on said user's share in relation to shares of other users located in said bottom part but not a top part of said dispatch list and wherein CPU bound users usually reside in said bottom part of said dispatch list and I/O bound users usually reside in said top part of said dispatch list.

15. A method as set forth in claim 14 wherein after completing each time slice for a user located in a top part of the dispatch list, repositioning said user later in the dispatch list by an offset based on said user's share in relation to shares of other users throughout said dispatch list.

16. A method as set forth in claim 15 further comprising the step of determining priorities of users, and wherein said top and bottom parts of said dispatch list are located on opposite sides of a currently determined priority of a user.

17. A method as set forth in claim 15 wherein said offset is inversely related to the magnitude of said user's share in relation to a sum of shares of other users located in said bottom part of said dispatch list.

18. A method as set forth in claim 14 wherein intensely I/O bound users are usually located in a top part of said dispatch list, intensely CPU bound users are usually located in said bottom part of said dispatch list, and other users spend a substantial percentage of their time in said top part and a substantial percentage of their time in said bottom part.

19. A system for allocating processor execution time in a computer amongst a multiplicity of users, said system comprising:
   means for specifying to the computer, shares of execution time for respective users;
   means for executing users which are I/O bound with processor time less than their respective, specified share(s) by not using significant processor time on users which are waiting for an I/O operation to complete but expediting allocation of a processor to the I/O bound users after their respective I/O operations complete;
   means for executing users which are CPU bound with available processor time in excess of their specified, respective share(s); and
   means for specifying to the computer, hard and soft share limits above said specified, respective shares for respective users, said hard limited users not receiving significantly more than their respective hard limits regardless of availability of additional processor time when said hard limited users have reached their respective hard limits, and at least one soft limit user receiving additional processor time above its respective soft limit when all other soft and hard limited users have reached their respective limits.

20. A system as set forth in claim 19 wherein both of the executing means position said users on a dispatch list, execute users which are ready to execute and located on the dispatch list, in order, for respective time slices, and after completing each time slice for an I/O bound user, the I/O bound user executing means repositions said I/O bound user later in the dispatch list by an offset based on the respective, specified share in relation to the sum of the shares of all users which have work in progress.

21. A system for allocating processor execution time in a computer amongst a multiplicity of users, said system comprising:
   means for specifying to the computer, shares of execution time for respective users;
   means for executing users which are I/O bound with processor time less than their respective, specified share(s) by not using significant processor time on users which are waiting for an I/O operation to complete but expediting allocation of a processor to the I/O bound users after their respective I/O operations complete; and
   means for executing users which are CPU bound with processor time in excess of their specified, respective share(s); and
   wherein both of the executing means position said users on a dispatch list, execute users which are ready to execute and located on the dispatch list, in order, for respective time slices, and after completing each time slice for a CPU bound user, the CPU bound user executing means repositions said CPU bound user later in the dispatch list by an offset based on the respective share in relation to a sum of shares of other CPU bound users, said sum excluding shares of I/O bound users.

22. A method for allocating processor execution time in a computer amongst a multiplicity of users, said method comprising the steps of:
   specifying to the computer nominal shares of execution time for respective users, hard limit shares for some of said users and soft limit shares for other of said users;
   executing users which are I/O bound with less than their respective, nominal shares; and
   executing users which are CPU bound in excess of their specified, respective nominal shares subject to said hard limited users not receiving significantly more than their respective hard limit shares regardless of additional available processor time, and wherein at least one soft limit user receiving additional processor time above its respective soft limit when all other soft and hard limited users have reached their respective soft and hard limits.

23. A computer program product for allocating processor execution time in a computer amongst a multiplicity of users, said product comprising:

a computer readable medium;

first program instruction means for receiving specification of shares for respective users;

second program instruction means for instructing a processor to execute users which are I/O bound with processor time less than their respective, specified share(s) by not using significant processor time on users which are waiting for an I/O operation to complete but expediting allocation of a processor to users after their respective I/O operations complete; and third program instruction means for instructing a processor, after the receipt of share specifications and after executions of I/O bound users and CPU bound users, to derive new shares for at least some of the CPU bound users based on a computation of the specified share for each of said CPU bound users in relation to a sum of specified shares of other CPU bound users, said sum excluding specified shares of I/O bound users; and fourth program instruction means for instructing a processor to execute said some CPU bound users based on their respective new shares; and wherein all of said program instruction means are recorded on said medium.

24. A computer program product as set forth in claim 23 wherein said new shares for said some CPU bound users are greater than their respective specified shares.

25. A computer program product as set forth in claim 23 wherein said sum of specified shares of other CPU bound users is a sum of specified shares of substantially all other CPU bound users.

26. A method as set forth in claim 1 wherein said new shares for said some CPU bound users are greater than their respective specified shares.

27. A method as set forth in claim 1 wherein said sum of specified shares of other CPU bound users is a sum of specified shares of substantially all other CPU bound users.

* * * * *